May 10, 1938. W. W. LASKER Re. 20,720

CARD PUNCHING MACHINE

Original Filed Feb. 2, 1933 7 Sheets-Sheet 1

INVENTOR
W. W. LASKER DEC'D.
BY REMINGTON RAND INC.
ASSIGNEE

BY W. A. Sparks
ATTORNEY

May 10, 1938. W. W. LASKER Re. 20,720
CARD PUNCHING MACHINE
Original Filed Feb. 2, 1933 7 Sheets-Sheet 2
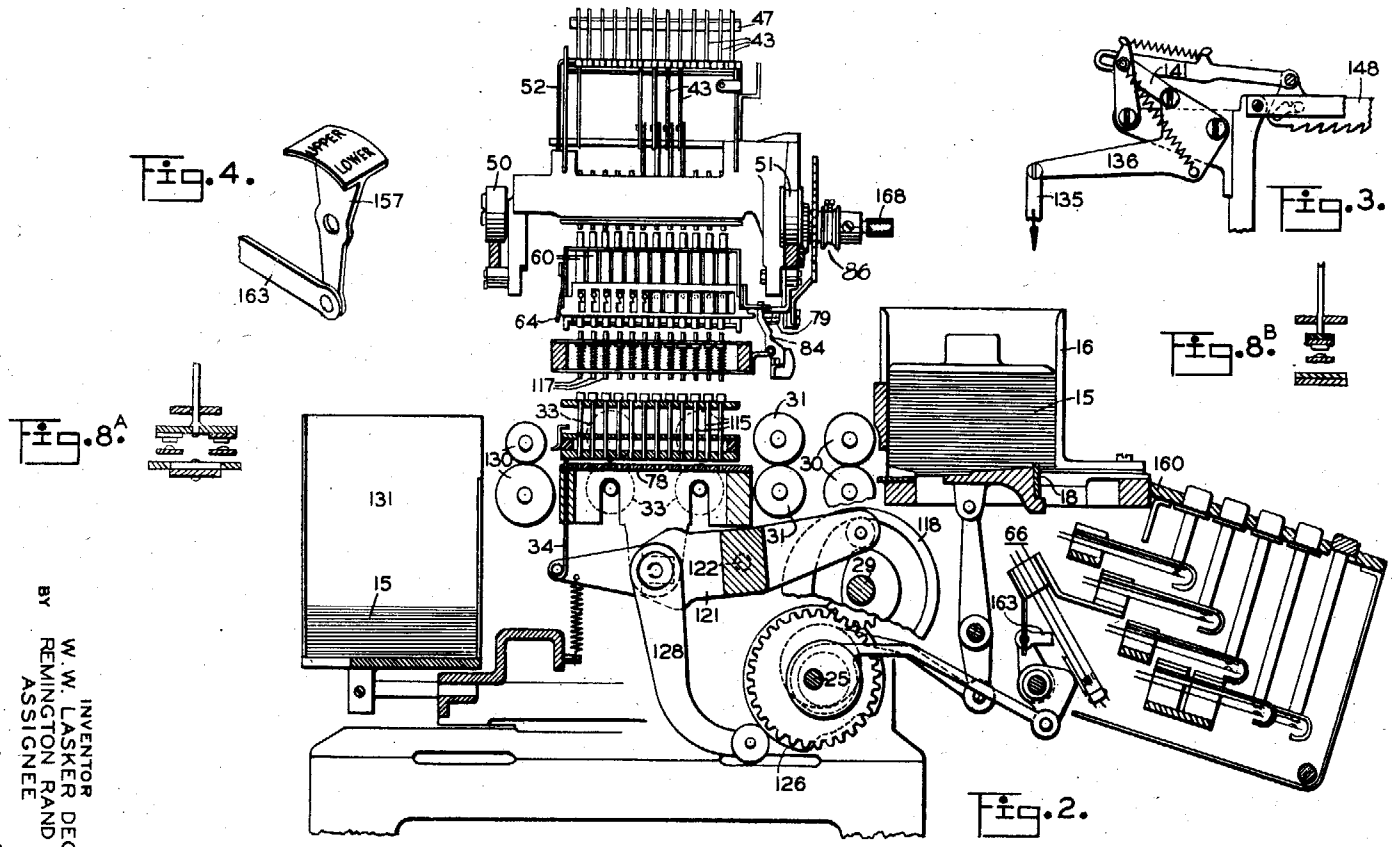
INVENTOR
W. W. LASKER DEC'D.
BY REMINGTON RAND INC.
ASSIGNEE
BY W. A. Sparks
ATTORNEY

CARD PUNCHING MACHINE

Original Filed Feb. 2, 1933 7 Sheets-Sheet 3

INVENTOR
W.W. LASKER DEC'D.
BY REMINGTON RAND INC.
ASSIGNEE
BY W. A. Sparks
ATTORNEY

CARD PUNCHING MACHINE

Original Filed Feb. 2, 1933 7 Sheets-Sheet 4

INVENTOR
W.W. LASKER DEC'D.
BY REMINGTON RAND INC.
ASSIGNEE

BY W. A. Sparks
ATTORNEY

CARD PUNCHING MACHINE

Original Filed Feb. 2, 1933 7 Sheets-Sheet 5

INVENTOR
W. W. LASKER DEC'D.
REMINGTON RAND INC.
ASSIGNEE

BY

BY W. A. Sparks
ATTORNEY

CARD PUNCHING MACHINE
Original Filed Feb. 2, 1933 7 Sheets-Sheet 6
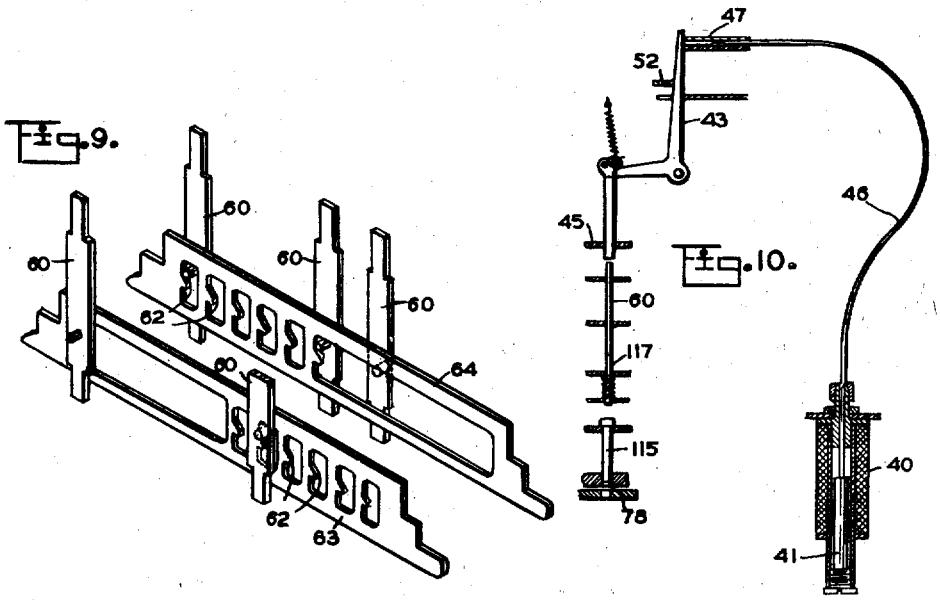
FIG. 11
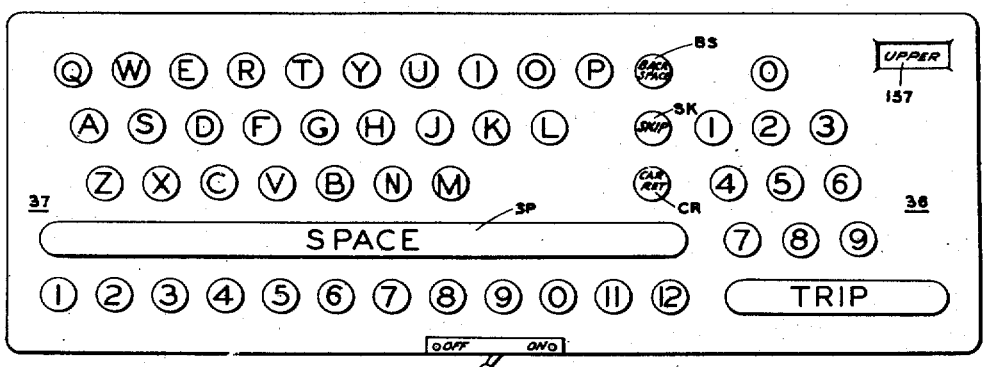
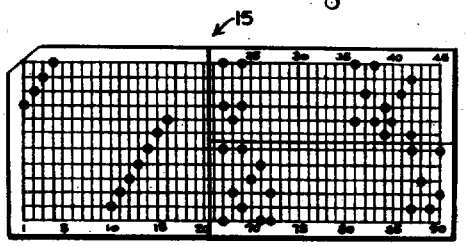
Fig. 12.
INVENTOR
W. W. LASKER DEC'D.
BY REMINGTON RAND INC.
ASSIGNEE
BY M. A. Sparks
ATTORNEY

INVENTOR
W. W. LASKER DEC'D.
BY REMINGTON RAND INC
ASSIGNEE

BY W. A. Sparks
ATTORNEY

Reissued May 10, 1938

Re. 20,720

UNITED STATES PATENT OFFICE 20,720

CARD PUNCHING MACHINE

William W. Lasker, deceased, late of Brooklyn, N. Y., by Remington Rand Inc., Buffalo, N. Y., assignee Original No. 2,044,708, dated June 16, 1936, Serial No. 654,812, February 2, 1933. Application for reissue August 21, 1937, Serial No. 160,267

26 Claims. (Cl. 164—113)

This application is a continuation in part of my preceding application, Serial No. 537,831, filed May 16, 1931.

This invention relates to card perforating machines for general purposes, but more particularly for constructing perforated cards to be used in statistical accounting and analyzing systems. The invention as illustrated by the particular embodiment herein is shown in connection with the well known equipment of the Powers system.

Tabulating machine installations may utilize either the 45-column card, which has long been in use, or the 90-column card, which is disclosed in U. S. patent to Lasker No. 1,780,621, dated November 4, 1930. Obviously, a punch which will perforate data cards according to either of these systems is an advance in the perforated card machine art, for it will permit a flexibility in the assignment of equipment, which cannot exist if punches for each of the systems of data representation are to be maintained. In the machine of the present invention, means are provided by which the operator may perforate either 45 column or 90 column cards. As disclosed the machine will perforate cards according to either a single hole code or a multi-hole code, the code of the 90-column card being illustrative of one of the varieties of multi-hole system. The machine is capable of remote control by the keyboard, although as illustrated herein the keyboard is constructed as a part of the machine. In order to clearly set forth the distinction between the first forty-five columns, which occupy the top half of a 90-column card, and the last forty-five columns, which occupy the bottom half of such a card, the former group of columns will be called hereinafter "the upper zone" and the latter group will be called "the lower zone".

Fig. 12 illustrates a composite card, the left end of which represents the form used in the 45-column system of codification. The upper and lower portions, respectively, of the right end are, according to the above definition, representative of the upper and lower zones of a 90-column card.

One object of the present invention is to slightly modify a well known card perforator so that it is capable of automatically retaining a card in the perforating chamber after an operation of the trip key-bar.

Another object of the present invention is to provide means for perforating a card according to any of a plurality of codifying systems.

Another object of the present invention is to provide automatic means for changing the zone in which perforation occurs according to whether the holes are to be in the upper or lower half of the card.

Other objects will be apparent from the following description when read in conjunction with the drawings in which:

Fig. 2 is a vertical cross sectional view of a Powers type of punch shown in normal or initial position.

Fig. 3 is a fragmentary view of back space mechanism in operated position.

Fig. 4 is an isometric view of an indicator.

Fig. 8*a* is a sectional view through a dual key contact mechanism controlled by one bank of keys.

Fig. 8*b* is a view similar to Fig. 8*a*, showing a single contact controlled by a key.

Fig. 9 is an isometric view of a pair of dual locking slides for a single columnar position for latching key controlled interponents.

Fig. 10 is a diagrammatic view of the mechanism controlled by a key controlled solenoid.

Fig. 11 is a diagram of one form of keyboard.

Fig. 12 is a diagram of punching in a card, which can be effected by the machine disclosed herein.

Figures 8, 13:
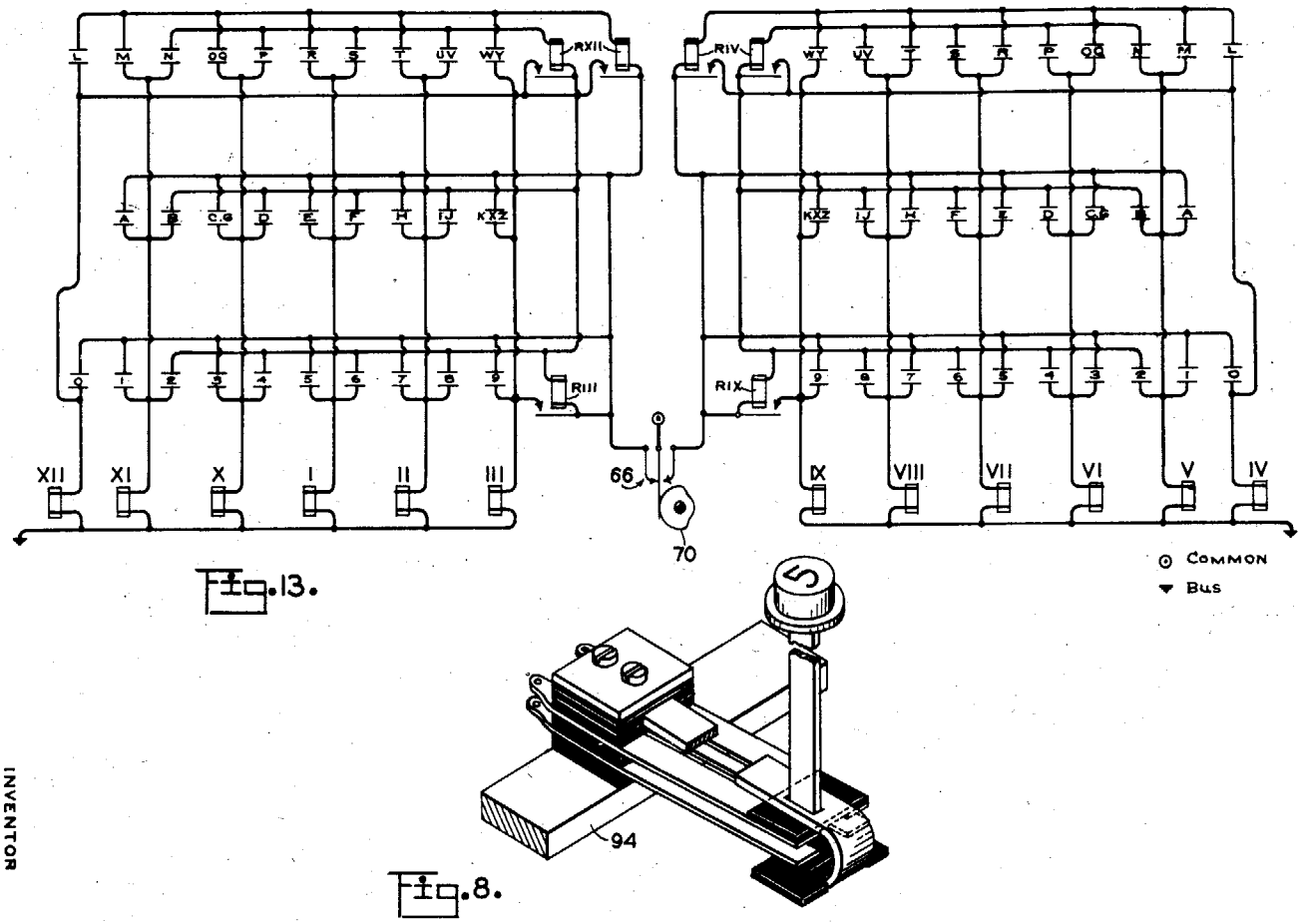
Fig. 8 is a perspective view of a pair of contacts controlled by a key.

Fig. 13 is a wiring diagram for a modified form of key mechanism.

Figure 14:
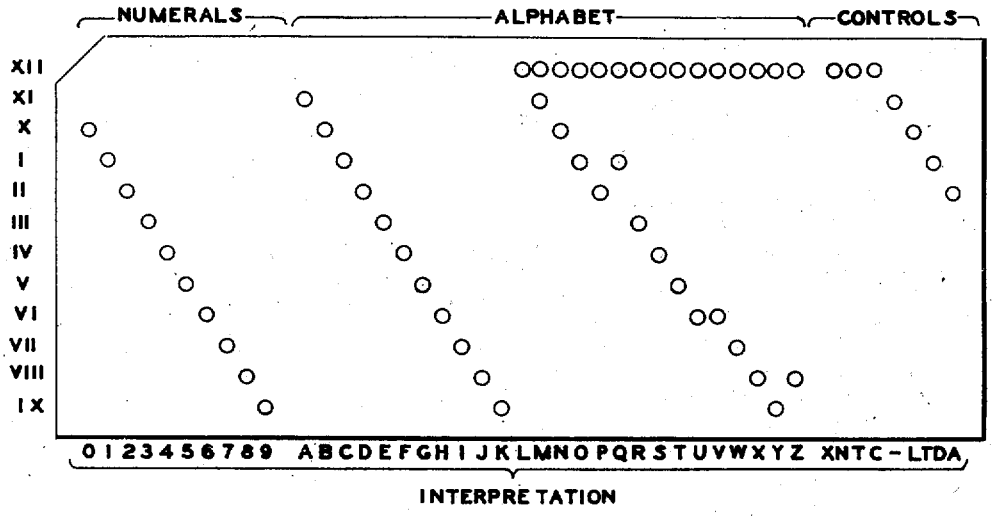

Fig. 14 shows a card as punched to represent the alphabet in a 45-column code, by a twenty-three character for twenty-six letters arrangement.

Figure 15:
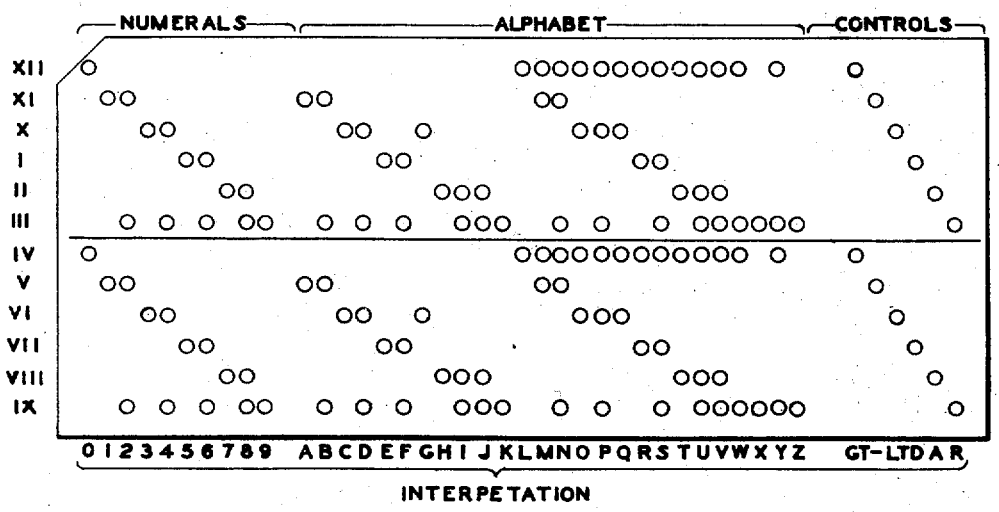

Fig. 15 shows a card as punched in a reduced, or nineteen character code for twenty-six letters, the card being in the 90-column code.

The present invention is directed to the adaptation of old perforator mechanism to the alternative punching at will of cards according to a single hole code or a multi-hole code by means of electric control from ulti-contact key buttons, and auxiliary relays, together with electric control of punch trip, back space, carriage return and the like and means for punching in both upper and lower zones in sequence. Much of the mechanism is well known and is illustrated in whole or in part in the following patents:

Weiland et al. 1,684.001, granted Sept. 11, 1928, Electric punch; Lasker 1,643,779, granted Sept. 27, 1927, Carriage return; Lasker 1,798,610, granted March 31, 1931, back space; Lasker 1,807,627, granted June 2, 1931, Carriage return; Lasker 1,810,317, granted June 16, 1931, Clutch.

Figure 1:
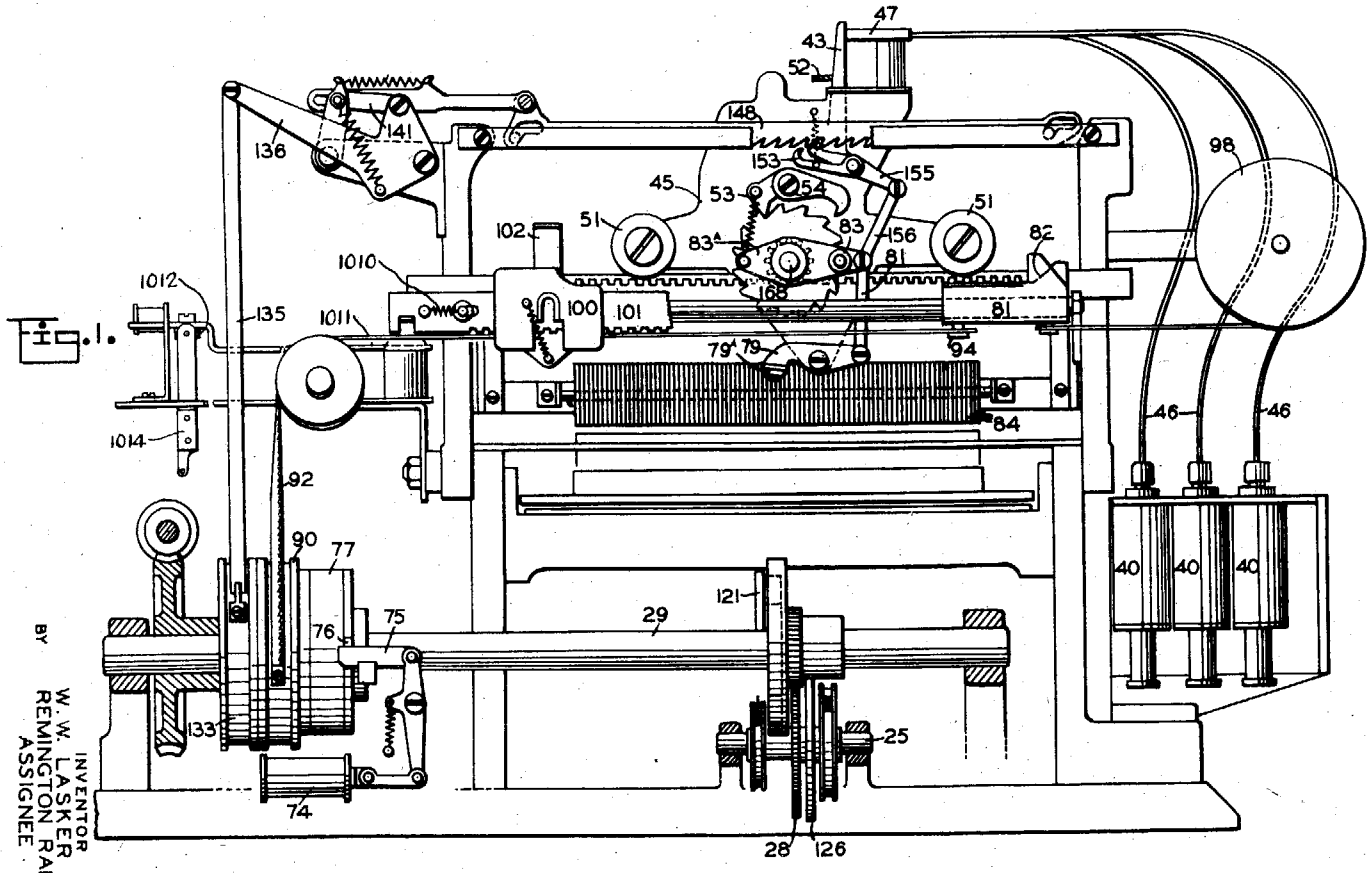
Fig. 1 is a front view in elevation partly in cross section, showing a Powers punch embodying the present invention.

The improved mechanism disclosed herein has the general appearance and mode of operation of the well known Powers gang punch. The familiar device consists of the usual frame work in front of which is a detachable keyboard which is arranged with keys simulating that of the standard typewriter (Fig. 11) where each key controls one or more electric contacts for energizing solenoids 40 (Figs. 1 and 10) for setting punch gags through the intermediary of a spring impelled carriage 45, which carries a Bowden wire terminal 47 for each of said solenoids 40. The carriage 45 is provided with the usual automatically controlled anchor escapement mechanism 53 and 54 for controlling the necessary step by step movement of carriage 45. The carriage 45 is constructed to travel on rails which support the rollers 50 and 51 (Figs. 1 and 2). Just to the rear of the keyboard is the card magazine 16 for holding a supply of cards 15 which are fed one by one at the proper times to feeding rolls, thence into the punching chamber where the card is aligned against prepositioned card stops by the skid rolls 33, and when the card stop is withdrawn fed by the said skid rolls to the eject rolls 130, and thence into the storage magazine 131. The various feed rolls are driven from the main shaft 29 by any suitable mechanism such as the usual gear trains (not shown). The card throat of the card magazine, the sets of retractor levers 83, the skip mechanism, the back space mechanism, the carriage return mechanism, the clutch mechanism as controlled by the trip key, etc., are essentially the same in principle as the corresponding mechanisms fully shown and described in the above cited patents and the differences in construction or function entailed by the novel mechanism of the invention herein are fully shown and described.

The use of twenty-three characters to represent twenty-six letters of the alphabet has been the practice in Powers tabulators for some years and is disclosed in U. S. Patent to Lasker No. 1,768,526, issued June 24, 1930. Fig. 14 illustrates the manner in which the alphabet is represented in 45-column code. In order to improve the operation of the tabulator, the number of characters used has now been reduced to nineteen. The system of codification by which this reduction is accomplished is shown in Fig. 15 and is disclosed in my co-pending application Serial No. 684,438, filed August 9, 1933; columns 39 to 45 of both Figs. 14 and 15 illustrate the possible positions of control perforations. In the figures, the various controls are indicated by abbreviations for which the following is the key: XN (naught block of X section), T (total), C (control), GT (grand total), — (subtraction), LT (list total), D (date), A (accept for double item cards), R (reject for double item cards). Other special controls may from time to time become necessary, in which event, the method of codification will at once become apparent to one skilled in the art.

In the foregoing tables the location of the perforations in the card are identified by numbers representing a line across the card. A representation of all the digits in both 45-column and upper and lower 90-column codes is shown in Fig. 12.

The first or 45-column numeric code is transformed, character for character, through the energization of appropriate solenoids. The specific means used in the present instance is best shown in Fig. 10, and consists of a series of solenoids 40 any one of which may be energized and temporarily retained while the Bowden wire 46 operates the bell-crank 43 to set, by mechanical means, the punch gags 117. Obviously XI and XII positions may or may not be punched, nevertheless the means are usually provided for such contingencies as may appear from time to time. An example of such use is for indicating months of the year or British currency, etc.

In the second, or alphabet code, a similar method is used for transforming the first half of the alphabet (see Fig. 13). In this case the solenoid 40, Bowden wire 46, bell-crank 43 and associated mechanism function as for straight numeric code. In the case of the latter half of the alphabet a specially provided relay RXII associated with the solenoid for XII operates to set the XII gag 117, thus punching two holes in one column, as code for the second half of the alphabet. Certain rarely used or strikingly similar characters are combined, for example, O and Q; U and V; X and Z, as is indicated in the code table.

The third and fourth, or 90-column codes are transformed in a manner analogous to the last half of the alphabet. All the odd digits are converted in exactly the manner described for the first code by the energization of the corresponding solenoid 40. The even digits are codified by the setting of the gags 117, both of the odd digits next below the even digit being transformed and of the nine in the same column. The last two columns of the aliphabetic code table are obviously a combination of the combination numerical code and the alphabetical code as is evident from a mere inspection of the two systems.

*General operation of the punch*

Figure 5:
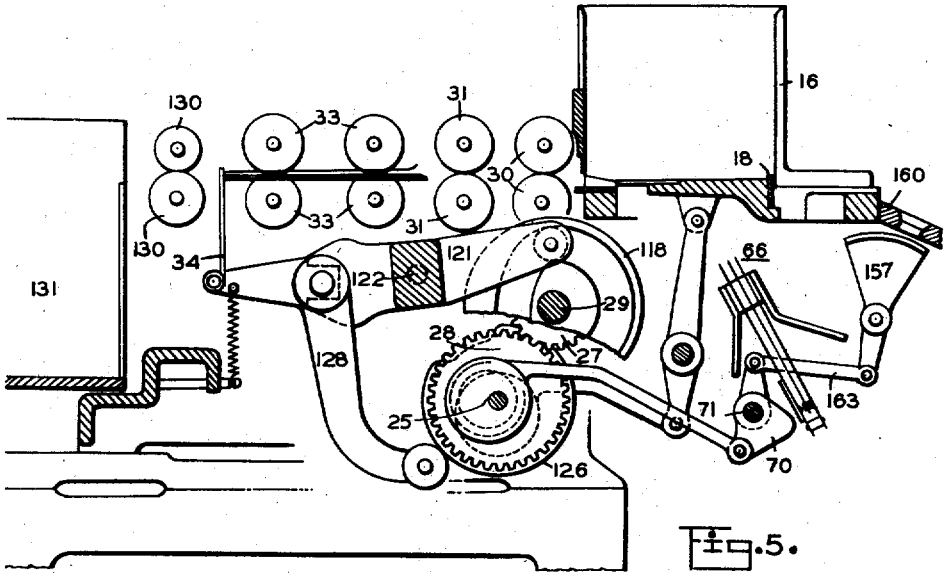
Fig. 5 is a cross sectional view of the lower part of the machine in an abnormal position.

The punch may be connected with a remote control keyboard, such as that of the typewriter, or disconnected therefrom. In the latter case, the device operates as an improved form of punch. When the punch is connected to a remote control keyboard, the term "auto perforator" will be used to connotate the remote control feature, and the device will operate as though all mechanism of the punch were blind or completely hidden inside of the case. The card or blank records to be punched are stacked and weighted in the magazine 16 (Figs. 1, 2, and 5), are fed seriatim, or one by one, through a preadjusted card throat by a harmonically reciprocated card picker 18 to the pairs of constantly rotating feed rolls 30 and 31, thence into the punching chamber 78. The punching chamber consists of a pair of matched perforated plates, the lower one serving as a die and the upper as a stripper and guide for the punches. The card to be punched is temporarily held stationary in the punching chamber 78 by a pair of cam and spring controlled card stops 34 against the transporting action of the duplex pair of continuously rotating skid rolls 33. The entire punching chamber 78 with the set of punches 115 (one for every possible perforating position), the card and punch guide support is given a reciprocatory motion for every rotation of the main shaft 29 by a suitably contoured box cam 118 fixed thereon, acting through a sturdy forked lever frame 121, which is pivoted near its mid points on trunnions 122 on the main frame. During the upward movement of the punching chamber 78 and its frame, the gagged punches 115 are held stationary relative to the main framework, and thus forced through the card in the punching chamber, at the location determined by the corresponding holes in the matched perforated plate. During the downward movement of the said parts the punches 115 are arrested from continued downward motion by the fixed stripper plate, which is contacted by the heads of the descending punches. The card stops 34 are withdrawn by springs acting on lever 128 controlled by cam 126, which is rotated once for each two rotations of the main shaft 29 by a permanently meshed gear train having a 1-to-2 ratio, then the constantly rotating skid rolls 33 at the extreme narrow margins of the punching chamber feed the punched card to a pair of ejecting rolls 130, and thence into the storage receptacle 131.

The keyboard and keys of the auto perforator (or punch) are generally the same as those shown in U. S. Patent 1,684,001, granted to Weiland et al., Sept. 11, 1928, and to my copending application S. N. 588,863, filed Jan. 26, 1932. In the case that the device is operating as an auto perforator, the remote keyboard may be of any desired form, such as that of the familiar typewriter. In the former case, it consists of sets of numeral keys 36—37 (Fig. 11) or a set of numeral keys 36 and a set of numeral and alphabet keys 37, illustrated diagrammatically in Fig. 7. There is also a series of special keys, such as the carriage return; the space; the back space; the skip, the trip and the trip repeat key. The said keys (numeral, alphabetic and special), and the contacts controlled thereby are mounted in a separate frame shown in Fig. 2, which may be completely detached from the machine by merely removing certain screws or bolts, and disconnecting certain electric connections, so that a plurality of differing types of keyboards can be used with a single basic punch mechanism.

*Alphabet keys*

The alphabet keys are connected into circuits in such a manner as to initiate electric current pulses to set punch gags in accordance with some one of the codes listed hereinabove.

Each of the alphabet keys when depressed completes an individual electric shunt circuit in the case of the keys from A to L, inclusive, and a double shunt circuit for the remaining alphabet keys. For the purpose of uniformity in description, the electric conductor which is common to a number of keys such as alphabet and numeral keys will be called "top" and the wire or conductor, which is usually individual to a particular key, will be called the "bottom". The tops of the alphabet keys A to L, inclusive, lead to a universal conductor, herein called "common", as diagrammatically indicated in Figs. 7 and 13, which is conventionalized as a circle with a dotted center (⊙). The bottoms of the said alphabet keys lead to the windings of solenoids XII, XI . . . IX, one solenoid for each key, thence to bus (▼). The wires, bus and common are, in fact, the opposite terminals of a generator after said terminals have passed through certain switches. Therefore, the depression of any of said alphabet keys will result in the establishing of a complete circuit from common, thence through the depressed alphabet key contact, thence through the winding of the corresponding solenoid identified by a roman numeral, thence to bus.

The energization of any solenoid identified by a roman numeral, causes its core 41 (Fig. 10) to rise against the action of gravity to shift the core of Bowden wire 46 to rock the corresponding bell crank 43, which is pivoted on the punch carriage, to depress an interponent 60, which when depressed is latched in depressed position by the one or the other of the two locking slides 63 or 64 (Fig. 9) according to the relative position of the said lever 43 with respect to the top or bottom of the card to be perforated. The slide 64 locks the six columnar interponents 60 (as viewed on a card) corresponding to the upper half of the card, and the latch 63 locks these interponents 60 (when viewed as possible perforations on a card) corresponding to the lower half of the card. It is thus seen that an interponent 60 may be latched in depressed position corresponding to the upper half of the card, and at a subsequent time some interponent 60, in the same column, may be depressed without releasing the previously set interponent provided it is located in the opposite half of the card i. e., in the opposite zone. There are latching slides 63 and 64 for each half column of interponents 60 and each latching slide is provided with locking noses or projections 62, for the corresponding upper and lower halves of the card, respectively. When one or more interponents 60 are in latched position, a spring pressed gag 117 (Figs. 2 and 10) associated with each depressed interponent is then in the path of the upward movement of the corresponding punches 115, so that when cam 118 rocks forked lever 121 to elevate the punching chamber 73, the location of the perforations is thus positively determined. Overlying each of the bell-cranks 43 is a universal bail 52 (Figs. 1 and 10) hence when any of the said levers 43 are rocked the bail 52 is rocked also. Said bail 52 operates the punch carriage escapement mechanism so as to permit the carriage to automatically step to the next columnar position of a card. The bail 52 is urged against the levers 43 by a light spring and is provided with a cam arm (not shown) for rocking the escapement anchor as is well known in the art.

In the case of the alphabet keys from M to Z, inclusive, two interponents 60 are set when such a key is depressed due to the energization of a low resistance series relay RXII, the one interponent corresponding to the bottom of the key depressed, and the other corresponding to the solenoid XII, for, when the relay RXII is energized, a circuit is completed from common through the armature of said relay, thence through conductor leading to solenoid XII, thence to bus. When the two solenoids are energized, two of the levers 43 are rocked, one of which is the XII lever, and hence sets the corresponding (XII) interponent 60, and the other of which is the lever which corresponds to the key depressed and hence sets the interponent 60, which also corresponds to the bottom of the key depressed, thus the alphabet characters from M to Z, inclusive, are each represented by two perforations. Certain letters having similar conventional outlines such as O and Q, V and U, and Z and X, are represented by the same pair of perforations. In the case of an auto perforator, that is, a punch with a remote keyboard, all the alphabet keys have their bottoms and tops connected in parallel with the contacts of the auxiliary or remote keyboard.

In some instances, it may be desirable to punch alphabetic characters in either the upper half of the card, or upper zone, or in the lower half of the card, or lower zone, in accordance with the 90-column alphabetic code listed hereinabove. To provide for this, the tops of certain of the alphabet keys lead to a side contact of a transfer switch 66, thence to the midpoint of said transfer switch to common. This modification will be described in detail hereinafter for it is in effect a carrying forward of the numerical 90-column perforation code.

*Numeral keys*

The numeral keys control operation of the solenoids IX, VIII, etc., according to what are in effect three effective positions of the transfer switch 66. Two series of numeral keys are provided; the one hereinafter called the straight or 45-column punching, is paralleled with the keys for the first half of the alphabet keys as is diagrammatically indicated in Fig. 7. The other series of numeral keys is provided with double contacts at both their tops and bottoms, and the tops of each half of the double numeral key contacts lead eventually to a transfer switch 66. When the first mentioned series (45 column) of keys are operated, the punch gags are set in exactly the manner described above for the first half of the alphabet and function as though the transfer switch 66 were absent, or what amounts to the same thing—as if there were a true first or ineffective position of the transfer switch 66. If the said transfer switch is shifted to one effective position, the second set of numeral keys 36 will set punch gags corresponding to the fields of the upper half of the card, and when in the second effective position, the same keys will effect gag setting for the fields of the lower half of the cards. The circuits controlled by the depression of any of these numeral keys of the second set are very similar to those described under the preceding heading for the alphabet keys, so that a brief description thereof will suffice.

In many instances, it is optional whether a zero perforation occurs on the cards for the well known Powers tabulator will recognize the absence of a perforation as a zero. Therefore, the "zero" position may be used for special control perforations, as indicated in the code charts shown hereinabove. The special control perforations will be sensed in the ordinary manner by the tabulator multiple translator, which will have special interpreter wires leading to the appropriate control elements of the tabulator as is well known in the art.

The depression of any odd digital key 36 of the second set of keys will establish the following circuit: Common, mid-tongue of transfer switch, thence to another tongue (according to the position of the switch operating cam 70), thence to the corresponding top of the odd digital keys, thence the bottom contact of the digit key depressed, thence to that solenoid identified by roman numeral, corresponding to the upper contact of the digit key which is connected to common through the transfer switch, thence to bus. The correspondence between the odd digit keys and the solenoids is as follows: Zero—XII; 1—XI; 3—X; 5—I; 7—II and 9—III for the upper half of the card and one effective position of the transfer switch and zero—IV; 1—V; 3—VI; 5—VII; 7—VIII and 9—IX for the lower half of the card and other effective position of the transfer switch.

In the case of even numerals, the circuit is established as follows: from common, thence to the mid-tongue of the transfer switch 66, thence through the one or the other of the outside tongues of the transfer switch, thence through low resistance relay RIII or low resistance relay RIX (according to the effective position of said transfer switch), thence to the tops of the even digits, thence through the corresponding bottom contact of the even key depressed, thence to the solenoid identified by roman numeral corresponding to the consecutive lower odd digit. A second circuit is completed when each even digital key is depressed from common, mid-tongue of the transfer switch 66, thence to the one or the other of the outer tongues, thence the armature of the corresponding low resistance series relay RIII or RIX, thence through the corresponding solenoid, thence to bus. Hence the depression of even digit keys results in the energization of two of the solenoids identified by roman characters, the one being the III solenoid, and the other the solenoid which corresponds to the lower consecutive odd digits in case the perforation occurs in the upper half of the card; or the one being the IX solenoid, and the other that solenoid which corresponds to the lower consecutive odd digit, if the perforation occurs in the lower half of the card.

It has been described that each of the solenoids identified by roman numeral attracts its armature and elevates the core of the associated Bowden wire 46 to rock the corresponding lever 43 and depress an interponent 60 to position a gag in the path of the upward movement of the punch 115. It has also been described that there is a spring-pressed interponent retaining slide 64 and a corresponding spring-pressed slide 63 for each column of interponents 60, corresponding to the halves of the card. When either relay RIII or relay RIX is energized, two of the levers 43 are operated simultaneously so that either a slide 64 or a slide 63 will, simultaneously latch two of the interponents of the same half of the card in depressed position. Each of the described sets of numeral keys may be paralleled by corresponding keys and a remote keyboard for converting the punch into an auto perforator. If desired such paralleled connections may be controlled by an automatic auxiliary mechanism, such as a control board or a typewriter carriage. Obviously, if circumstances require, a plurality of keys may be depressed simultaneously or other codes requiring more perforations for a single character may be readily devised. It is to be understood that the particular codes described are merely representative.

*Space key*

The space key (Fig. 11) effects a movement of the punch carriage 45 without the setting of an interponent 60 (sometimes the space key contacts parallel those of the zero keys) so that a depression of the space key will result in the setting of an interponent by the X solenoid. The depression of the space key completes a circuit from common through the contacts of the depressed key, thence through the conductor to the solenoid marked SP, thence to bus. The solenoid SP elevates its armature to shift the core of the associated Bowden wire 46, connected to the upward projections of the bail 52 (Figs. 1, 2, and 10). An arm of the bail 52 extends downwardly and carries a roller (not shown), operating in the cam slot in an arm fixed to the shaft of the escapement 53—54, thus permitting the carriage 45 to travel under the action of its spring drum 98, a distance of one card column space. The space key can be paralleled in the remote keyboard for a corresponding operation.

*Skip key*

At times it is desirable to permit the punch carriage 45 to travel a predetermined extent for skipping a plurality of card columns. Such operations are controlled by a special key, identified as a skip key in Fig. 11.

Figure 7:
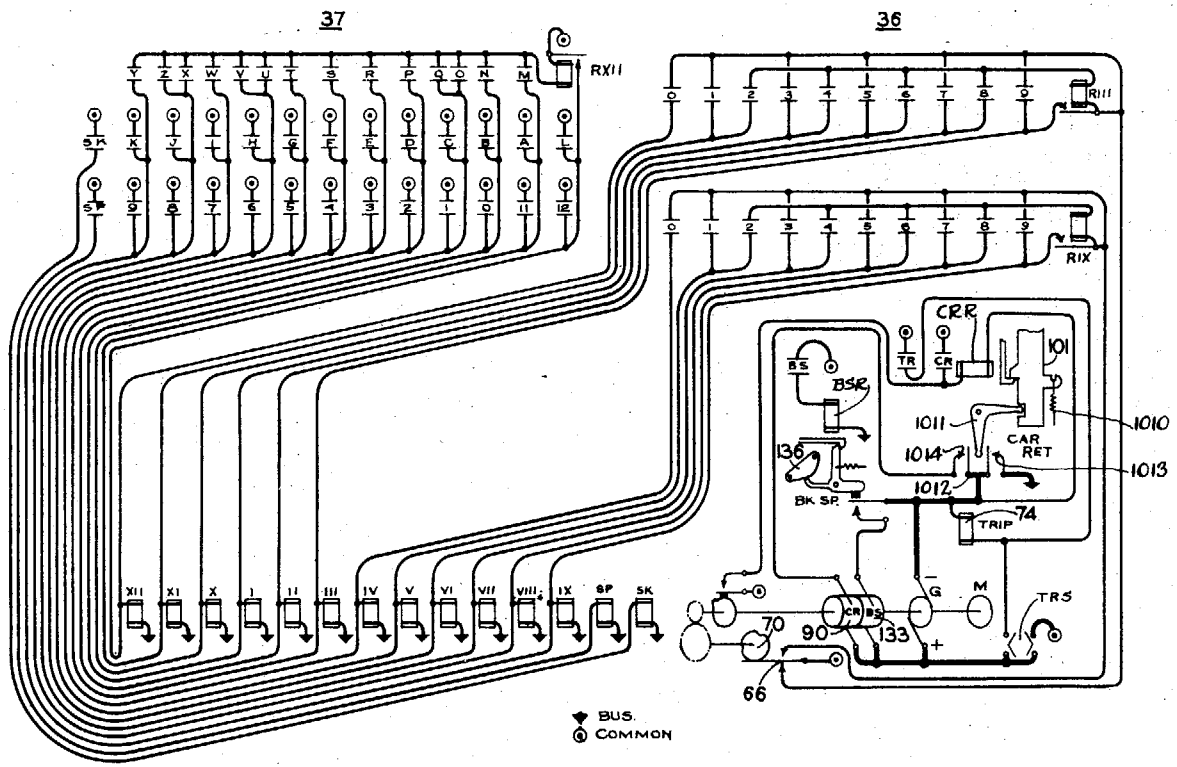
Fig. 7 is a wiring diagram of the improved punch mechanism, showing banks of keys for effecting punching in any of a plurality of different codes.

Referring to Figs. 7 and 13, it is seen that the skip key (SK) can complete a circuit from common through the contacts of said key, thence through a conductor to the solenoid (SK), thence to bus.

Fixed to the frame of the machine is the usual skip bar (not shown) on which may be placed certain optional adjustable stops for limiting the free travel of the carriage 45. When the skip key is depressed, the Bowden wire operated by the solenoid SK displaces and locks the escapement 53—54 by the usual mechanism, fully shown and described in my Patent No. 1,643,779, granted Sept. 27, 1927, and the said lock is disabled when the carriage 45 reaches a said stop.

*Carriage return key*

A carriage return key CR (Fig. 11) causes the punch carriage 45 to be automatically shifted from any position to a pre-selected normal. The carriage return key CR completes a circuit from common, thence to the contacts of the said key, thence through winding of relay CRR, thence to generator. The conductor, leading to the winding of the relay CRR, is branched. This branch leads to the usual electro-mechanical switch at the end of the shaft 29, shown diagrammatically in Fig. 7, thence to common. When the carriage return relay CRR is energized, the carriage return switch bar 101 (see also Fig. 1) is permitted to shift slightly under the action of a suitably located spring 1010 (Figs. 1 and 7) to rock the bell-crank 1011, which thereupon breaks the normal connection between a contactor 1012 connected to the negative side of the generator and a contact 1013 connected to the bus thus breaking the circuit of all keys (substantially as in Lasker 1,883,986, lines 95–110, page 2) and elements which derive current from bus; and to complete a circuit from the negative side of the generator through the contactor 1012 and the alternate contacts 1014 of said switch, thence through the winding of the carriage return solenoid clutch 90, thence to the positive side of generator thus energizing the clutch. The energization of the carriage return solenoid clutch 90 connects the free elements thereof to the constantly rotating main shaft 29, and thus exerts tension on the band or tape 92, which is attached to the carriage return block 81 at stud 94 (Fig. 1). Said block travels to the left in Fig. 1, and contacts with a grooved collar 86 on the stud 168, which is rigid with the main frame of the carriage 45. The carriage return solenoid clutch remains energized so long as the bar 101 is in the abnormal position, which it attained with the energization of the relay CRR. The bar 101 is returned to normal position as soon as the stud 168 contacts with the optionally settable carriage return stop 100, this return to normal causing reconnection of the negative side of the generator to bus and breaking of the alternate contact 1014, and hence the circuit of the carriage return solenoid. Then the block 81 is automatically returned to normal by the usual spring drum 98 acting through a tape attached to the block 81. The optionally adjustable stop 100 is provided with a spring urged finger piece 102, which may be depressed so that the stop 100 may be manually shifted to any desired position. Also attached to the block 81 is an inclined plane 82, which rides under a roll 83 fixed to an arm **83*a* pivoted on the stud 168, thereby rocking said arm. Connected to the arm 83*a* is a link 81, which rocks the cancelling lever 79 when arm 83*a* is rocked. The cancelling lever 79 carries a roll 79*a*, which is normally out of the path of the cams on the retract levers 84, but when the inclined plane 82 rocks the lever 79, the roll 79*a* is lowered so that it interferes with the said cams on the retract levers 84, and thereby rocks each and every retract lever 84 to shift the corresponding slides 63 and 64 to release the depressed interponents 60, and thus disable the corresponding punch gags. Therefore, every operation of the carriage return mechanism results in cancelling the previous setup. The operation of the described mechanism is automatically initiated through the operation of the electro-mechanical switch, as will be described under the heading of trip key. If desired, certain of the retract levers 84 may be rocked out of normal position, whereby the corresponding slides 63 and 64 will not be shifted. The described adjustment of levers 84** is used for preserving constant data such as dates, ledger numbers, etc.

*Back space key*

The back space key BS (Fig. 11) is used generally for making corrections in an erroneous setup of the interponent 60. If certain of the interponents 60 have been inadvertently depressed and latched, the back space key BS is operated to erase the error. The depression of the said key BS completes a circuit from common through the contact of the back space key BS, thence through the winding of the back space relay BSR, thence to bus. When relay BSR is energized, a mechanical switch is operated to close a pair of contacts in a circuit leading from the negative side of the generator, thence through the said contacts, thence through the winding of the back space solenoid clutch 133, thence to the positive side of the generator.

The erroneously depressed interponents 60 are released as follows: When the back space solenoid clutch 133 is energized, the free element of such clutch is connected with the constantly rotating shaft 29, and bell-crank 136 is rocked by a link 135, extending between said clutch and bell-crank, and the rocking of the bell-crank straightens a toggle comprising link 141 and an arm of the bell-crank 136 as is best shown in Fig. 3. The straightening of said toggle shifts a ratchet toothed bar 148, both laterally and downwardly, and the downward shifting thereof causes a tooth of said bar 148 to engage a rockable claw 153 pivoted on the carriage frame and the lateral movement pulls the said claw backwardly an extent corresponding to a space travel of the carriage 45 and thus effects a back spacing thereof. Integral with said claw 153 is lever 155 connected by a link 156 to the rocker **83*a* described as being rocked during a carriage return operation. Hence rocking of the claw sets the retract lever 79 and the lateral movement of the carriage causes a release of the set interponents 60 of the preceding column in exactly the same manner as has been described in connection with the carriage return. When the bell-crank 136** reaches the position shown in Fig. 3, an arm (not shown) resets the electro-mechanical switch operated by the relay BSR as is diagrammatically illustrated in Fig. 7. The details of this mechanism are fully described and shown in my cited Patent, 798,610. The details of this mechanism do not form a part of my invention and, therefore, need not be further described.

*Trip key*

Figure 6:
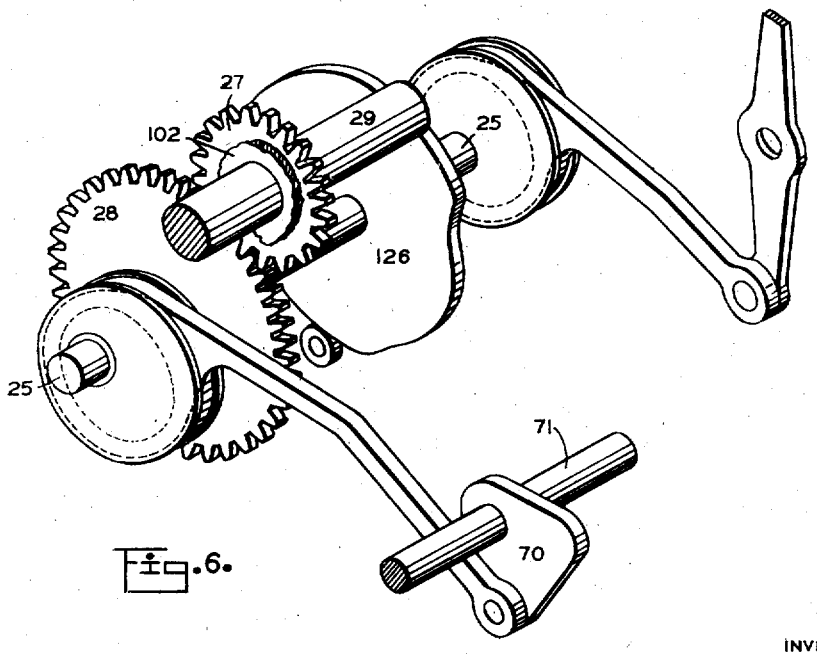
Fig. 6 is a diagrammatic isometric view of a supplementary shaft, eccentrics, and cams controlled thereby.

The trip key TR is depressed to initiate a punch operation of the machine. Such operation results in a single cycle of the main shaft 29 and the punching of the card in accordance with the setting of the interponents 60, but the card stops 34 (Figs. 2 and 5) may not be withdrawn for said elements operate only on alternate cycles because of the reduction gearing 27—28 which is shown in Fig. 6, and hence the card will remain in the punching chamber. Such an operation corresponds to a partial punching of the required data. When the trip key is depressed, a circuit is completed from common through the contacts of the trip key, thence through the trip solenoid 74 (Fig. 1), thence to the negative side of the generator. At about the time the main shaft 29 completes a revolution, the electro-mechanical switch mounted on the main shaft closes a circuit through a branch of the carriage return circuit, thus completing a circuit from common through the contact to said electro-mechanical switch, thence through the carriage return relay CRR, this initiating a carriage return operation, which operates in exactly the same way as when the carriage return key CR is depressed. The armature of the trip solenoid 74 is connected to the spring urged rocker, which, in turn, controls the clutch, breaking and releasing bolt 75. When the solenoid 74 is energized, the bolt 75 is withdrawn from the path of the clutch breaking lug 76, thus permitting the free element of the clutch 77 to be frictionally connected to the constantly rotating shaft 29, thus initiating a punching operation. As soon as solenoid 74 is de-energized, the bolt 75 is shifted to normal or clutch breaking position under the action of a suitably located spring, and is thus in the path of the normally free element of the clutch 77 and breaks or releases the clutch after the completion of the rotation of the main shaft 29, thus restoring the parts to normal. The details of one form of the clutch are fully shown and described in my cited Patent 1,810,317. The details of the clutch mechanism do not form a part of the invention claimed herein.

*Trip repeat switch*

Mounted in front of the keyboard is a trip repeat switch TRS for repeating perforations on a card. Normally, the trip repeat switch connects the positive side of the generator to common, but, when it is shifted for multiple punchings, the connection between the positive side of the generator and common is broken and a new circuit is completed to the positive side of generator from the trip repeat switch, thence through the winding of the solenoid 74 and thence to the negative side of the generator, thus resulting in multiple operation of the main shaft 29; for the solenoid 74 is energized as long as the switch TRS is in the described set position. As soon as the connection to common is broken, the circuit to the electro-mechanical switch for energizing the carriage return relay CRR is broken and the carriage return mechanism is accordingly disabled. The interponent set up can be erased by shifting the switch TRS to normal and depressing the TR key as described above. The trip repeat switch may be used for punching constant data on a plurality of cards which have been already partially perforated. Examples of such extra perforations are ledger numbers, dates, universal control perforations, or even complete reperforation of cards which have been used.

*Electro-mechanical switch*

The electro-mechanical switch is merely a commutator or a cam fixed to the shaft 29 for completing a circuit from common to a branch of the bottom of the carriage return key CR at about the time the shaft has completed a full revolution. This mechanism is fully described in my cited Patent 1,807,627 and, therefore, need not be further described.

*Transfer switch*

The transfer switch 66 (Figs. 2 and 5) is a pair of blades with an interspersed leaf, electrically connected to common. The outside blades are connected respectively to half of the tops of dual key contacts, best shown in Fig. 8*a*, and diagrammatically illustrated as separate sets of keys in Fig. 7. The transfer switch can be viewed as a switch mechanism, having three positions; first, ineffective, which corresponds to an operation of the keys 37; second, "upper", when the keys 36 are effective for closing circuits of solenoids XII—III; and third "lower" when the said keys 36 are effective for closing circuits of solenoids IV—IX. The transfer switch is an automatic mechanism for converting a single bank of keys into a multiple bank of keys. This conversion is diagrammatically illustrated in Fig. 11, where there is only a single bank of keys for the 90-column type of perforation, whereas the circuit diagram of Fig. 7 can be interpreted to indicate a plurality of banks. Since the transfer switch is operated by the shaft 25 (Fig. 6), which rotates at only half the speed of the main shaft 29, it is seen that the transfer switch operates during every other cycle of the main shaft 29 and during such cycle only, so as to alter the relation of the keys 36 in the keyboard 160 with respect to the solenoid 40.

It is desirable to provide an indicator or signal to indicate the position of the transfer switch with respect to the keys 36 in the keyboard 160. This is most readily accomplished by a link connection 163 between an arm on the transfer switch operated shaft 71 and an indicator 157. The indicator 157 may be provided with any suitable indicia such as "Upper" and "Lower" as is best shown in Fig. 4.

*Modification*

As indicated in the code tables above, alphabet perforations may be either of the 45-column type, or of the 90-column type. If they are of the 90-column type, it is desirable to have means for switching from one to the other by the transfer switch 66. This is readily accomplished by the circuit connections diagrammatically shown in Fig. 13. It will be noticed that a portion of the alphabet keys have top circuits, which do not pass through any relay, thus corresponding to those letters which are representable by a single perforation. In fact, the single perforation alphabet characters are identical with certain of the odd numeral perforations. Another portion of the alphabet is represented by two perforations, corresponding to the perforations representing even digits. The portion of the alphabet just described corresponds generally to the characters A to L, inclusive. The remainder of the alphabet is represented by either two perforations or three perforations. In every case, the second half of the alphabet corresponds to a perforation representing "L" combined with the above described single and double perforations corresponding to the odd and even digits, respectively. The mechanism for perforating the "L" perforation may comprise two separate relays as shown in Fig. 13, or a single double wound relay. In any event, all the tops of the 90-column alphabet finally become a single conductor which terminates on one blade of the transfer switch, so that this mechanism in effect provides a carrying forward of the described 90-column codes. Obviously, other and more complicated codes can be readily devised according to the principles set forth hereinabove. Again, other codes can be generated by simultaneous depression of a plurality of character keys as is well known in the art.

What I claim as new, and desire to secure by Letters Patent, is:

1. In a card punching machine, the combination of a gang of punches, a set-up mechanism for selectively determining which of said punches shall be rendered effective for gang punching, said set-up mechanism comprising digit keys, means by which an actuation of said digit keys is operative to effect a set up for certain only of said punches operating only within one or another of a plurality of limited zones on the card to be punched, controlling means for determining which of the punches the set-up mechanism shall control under the operation of said digit keys, thereby determining which of the limited zones on the card shall be punched, and automatically operating means actuated at each punching operation for shifting said controlling means to alternate the punches controlled by the set-up mechanism under the operation of said digit keys and thereby automatically alternate the limited zones on the card within which punching is effected.

2. In a card perforating machine, the combination of a gang of punches, a set-up mechanism for selectively determining which of said punches shall become effective, said set-up mechanism comprising a first set of digit keys, a second corresponding set of digit keys, means by which an actuation of said second set of digit keys is operative to effect a set up for certain only of said punches operating only within one or another of a plurality of limited zones on the card to be punched, controlling means for determining which of said punches the set-up mechanism shall control under the operation of said second set of digit keys, thereby determining which of the limited zones on the card shall be punched, and means by which an actuation of digit keys of the first set is operative to effect a set up of punches capable of operating throughout a full column of the card to be punched.

3. In a card perforating machine, the combination of a gang of punches, a set-up mechanism for selectively determining which of said punches shall become effective, said set-up mechanism comprising a first set of digit keys, a second corresponding set of digit keys, means by which an actuation of said second set of digit keys is operative to effect a set-up for certain only of said punches operating only within one or another of a plurality of limited zones on the card to be punched, controlling means for determining which of said punches the set-up mechanism shall control under the operation of said second set of digit keys, thereby determining which of the limited zones on the card shall be punched, automatically operating means for shifting said controlling means to alternate the punches controlled by the set-up mechanism under the operation of the digit keys of said second set and thereby automatically change from one to another of the limited zones on the card within which punching is effected under the set-up controlled by the digit keys of the second set, and means by which an actuation of digit keys of the first set is operative to effect a set-up of punches capable of operating throughout a full column of the card to be punched.

4. In a card punching machine, the combination of a gang of punches; and set-up mechanism for selectively determining which of said punches shall be rendered effective for gang punching, said set-up mechanism comprising digit keys, means by which an actuation of said digit keys is operative to effect a set-up for certain only of said punches operating only within one or another part of each of the columns, or of limited zones, on the card to be punched, controlling means for determining which of the punches the set-up mechanism shall control under the operation of said digit keys, thereby determining which part of the columns, or which of the zones on the card shall be punched, and automatically operating means for shifting said controlling means to vary the punches controlled by the set-up mechanism under the operation of said digit keys, thereby automatically changing from one to another limited zone on the card within which punching is effected.

5. In a card punching machine, the combination of a gang of punches; a set-up mechanism for selectively determining which of said punches shall be rendered effective for gang punching, said set-up mechanism comprising digit keys, means by which an actuation of said digit keys is operative to effect a set-up for certain only of said punches operating only within one of a plurality of limited zones on the card to be punched, controlling means for determining which of the punches the set-up mechanism shall control under the operation of said digit keys, thereby determining which of the limited zones on the card shall be punched; means for feeding a card to punching position; stop means for arresting the card in such position, and means for withdrawing said stop means from arresting position only after a plurality of punching operations has been effected, whereby a set-up for punches operated in one limited zone on the card may first be effected and a second set up for punches operating in another limited zone on the card may next be effected before cycling the machine to punch the card and releasing the latter from control of said stop means for feeding movement from punching position.

6. In a card punching machine, a set-basket having rows of denominational plungers; a keyboard; means controlled thereby for setting up said plungers, said means including a series of denominational selecting means controlled from said keyboard for first setting up the plungers corresponding to one limited zone of the card; operating means for perforating the card according to the set-up in the basket; and means controlled by said operating means for transferring the action of the keyboard to a different set of denominational selecting means to thereby control the set up for a different limited zone of the card.

7. In a card punching machine, a set-basket having rows of denominational plungers; a keyboard; means for setting up said plungers including a series of denominational magnets, means including a source of power for energizing said magnets upon operation of the keyboard; and means including a circuit controlling device for first setting up the plungers corresponding to one limited zone of the card; operating means for perforating the card according to the set up in the basket; and means controlled by said operating means for transferring the action of the keyboard to a different set of denominational magnets to thereby control the set-up for a different limited zone of the card.

8. In a card punching machine for preparing statistical records, the combination of a die-plate having a series of holes arranged in denominational rows; operating mechanism therefor; a series of punches cooperating with said die-plate to perforate the card; a set-basket having a series of plungers for individually setting the punches to make them operative on cycling the die-plate operating mechanism; and controlling means for operating the plungers, said last mentioned means including a traveling carriage having a series of denominational levers for simultaneously setting plungers in each row, a series of denominational magnets operatively connected to said levers, means for selectively energizing the magnets including a circuit controlling keyboard having a series of digit keys for alternately controlling a group of said magnets upon operation of such keys during the first course of the carriage, and means for automatically shifting the control from said digit keys to a different set of magnets during the second course of the carriage.

9. In a card punching machine for preparing statistical records, the combination of a die-plate having a series of holes arranged in denominational rows; operating mechanism therefor; a series of punches cooperating with said die-plate to perforate the card; a set-basket having a series of plungers for individually setting the punches to make them operative on cycling the die-plate operating mechanism; and controlling means for operating the plungers, said last mentioned means including a traveling carriage having a series of actuating levers for simultaneously setting plungers in each row, a series of magnets operatively connected to said levers, means for selectively energizing the magnets including a circuit controlling keyboard having a series of keys for controlling one or two groups of said magnets upon operation of such keys during the first course of the carriage, and means for automatically shifting the control from said keys to a different group of magnets during the second course of the carriage; and a second set of keys operative to control all of said magnets.

10. A card punching machine having card punching means, a set-basket for controlling the set-up of the card punching means, a traveling carriage for setting up a condition in denominational rows in said set-basket; means including a keyboard having two duplicate sets of digit keys, one set of digit keys being effective to alternately control one of two groups of denominational rows in said basket, the control of either group being to the exclusion of the other group and the other set of digit keys being effective upon an operation thereof to control all the denominational rows.

11. A card punching machine having card punching means, and means for controlling the set-up for the card punching means including a set-basket, plungers therein arranged in denominational rows or columns, a traveling carriage for setting up a condition in said set-basket, means including a keyboard having two duplicate sets of digit keys, and means whereby one set of said digit keys is effective upon operation thereof to alternately control each of two groups of said plungers in each of a plurality of denominational columns in said set-basket, the control of either of said groups of plungers being to the exclusion of the other group and whereby the other set of digit keys is effective to control all of said plungers in each denominational column of the set-basket.

12. In a card punching machine, the combination of a card punching mechanism including a series of rows of punches, each row corresponding to a column of a record card; a set-basket including a set-bar or plunger for each punch, a traveling carriage for setting said bars or plungers seriatim; a keyboard including groups of digit keys; and electro-magnetic means for operatively connecting the keyboard with the carriage to set up a condition in the set-basket including means whereby one group of digit keys on operation thereof is effective to control a predetermined zone in each row of punches and the other group of digit keys on the operation thereof is effective to control a whole row of punches, and means for auomatically switching the control of the first mentioned group of digit keys to control another predetermined zone of the rows of punches alternately after each operation of the punching machine to perforate a card.

13. In a card punching machine, the combination of a card punching mechanism including a series of rows of punches, each row corresponding to the column of a record card; a set-basket including a set-bar or plunger for each punch, a traveling carriage for setting said bars or plungers seriatim; a keyboard including groups of digit keys; and electro-magnetic means for operatively connecting the keyboard with the carriage to set up a condition in the set-basket including means whereby one group of digit keys on operation thereof is effective to control a predetermined zone in each row of punches and the other group of digit keyes on the operation thereof is effective to control a whole row of punches, means for automatically switching the control of the first mentioned group of digit keys to control another predetermined zone of the rows of punches alternately after each operation of the punching machine to perforate the card; and means for indicating which zone of the first mentioned digit keys is effective to control at any given time.

14. In a card perforating machine, the combination of a gang of punches, set-up mechanism for selectively determining which of said punches shall become operative, said set-up mechanism comprising duplicate sets of digit keys, and means by which an actuation of one set of said digit keys is operative to selectively effect a set-up for any of said punches to punch at any point throughout the card if desired and by which an actuation of the other set of keys is operative to selectively effect a set-up for a limited number only of the punches which operate only within a limited zone on the card to be punched.

15. In a card perforating machine, the combination of a gang of punches, set-up mechanism for selectively determining which of said punches shall become operative, said set-up mechanism comprising duplicate sets of digit keys, means by which an actuation of one set of said digit keys is operative to selectively effect a set-up for any of said punches to punch at any point throughout the card if desired and by which an actuation of the other set of keys is operative to selectively effect a set-up for a limited number only of the punches which operate only within a limited zone on the card to be punched, and means for shifting the control by said last mentioned set of keys from the set-up means for one limited group of punches to the set-up means of another limited group of punches operative only in another limited zone on the card to be punched.

16. In a card perforating machine, the combination of a gang of punches, and set-up mechanism for selectively determining which of said punches shall become operative, said set-up mechanism comprising a set of digit keys, means by which an actuation of said keys is operative to selectively effect a set-up for a limited number only of said punches operative only in a restricted zone on the card to be punched, the punches operative in one restricted zone being different from the punches operative in another restricted zone, and means for shifting the control by said digit keys from the group of set-up devices for one restricted group of punches to the set-up devices of another such group of punches, whereby a set-up may be selectively effected of a restricted number only of punches for punching in either an upper or a lower zone on the card to be punched depending on which group of set-up devices is under control of said keys, a second duplicate set of digit keys, and set-up mechanism controlled thereby for selectively controlling all of said gang of punches.

17. In a card punching machine, a die, a gang of punches cooperating therewith, set-bars for the actuation thereof and means for actuating said set-bars comprising a plurality of keyboards independently operable upon the same set-bars for operation thereof according to a plurality of codes, one of said keyboards being operable upon all of said set-bars in whole columns and another of said keyboards being operable upon said set-bars in half columns only, and means cooperating with said second keyboard to indicate which half of said set-bar columns it is operable upon.

18. In a card punching machine, the combination of a die, a gang of punches, set-bars for the actuation thereof, and a keyboard for the actuation of said set-bars comprising two sets of keys operable alternatively for the actuation of set-bars according to different codes, and a single set of carriage control keys operable interchangeably with either of said sets of code keys, comprising trip bar, backspace key, skip key, carriage return key, and space key.

19. In a card punching machine, the combination of a die, a gang of punches, set-bars for the actuation thereof, and a keyboard for the actuation of said set-bars comprising two sets of keys operable alternatively for the actuation of set-bars according to different codes, and a single set of carriage control keys operable interchangeably with either of said code keyboards, comprising trip bar, backspace key, skip key, carriage return key, and space key, and an indicator member to show the mode of actuation of said keys.

20. In a card punching machine, a die, a gang of punches, set-bars for the actuation thereof, an electromagnet system for actuation of said set-bars and a keyboard and relay system for the actuation of the magnets therein comprising a set of digit keys having contacts separately connected to said magnets, and a relay member in circuit with certain of said keys for the energization of a second magnet when certain keys are closed.

21. In a card punching machine, a punch system, actuating and setting means therefor, a numerical keyboard system comprising two sets of digit keys, one of said sets having single pairs of contacts respectively connected to magnets in said setting means and the other of said sets comprising digit keys having double pairs of contacts connected to said magnets to control the alternative selection of either of the said single or double pairs of contacts.

22. In a card punching machine, a punch system, actuating and setting means therefor, a numerical keyboard system comprising two sets of digit keys, the keys of one of said sets having single pairs of contacts respectively connected to magnets in said setting means and the keys of the other set having double pairs of contacts, and a change-over switch adapted to energize one or the other of said double pairs for each key.

23. In a card punching machine, a punch system, actuating and setting means therefor, a numerical keyboard system comprising two sets of digit keys, the keys of one of said sets having single pairs of contacts respectively connected to magnets in said setting means and the keys of the other set having double pairs of contacts, a change-over switch adapted to energize one or the other of said double pairs for each key, and a pair of common leads between said changeover switch and said double contacts, the contact pairs having one of each connected to one of said set of common leads, one contact of each off digit key being connected to one or the other of the common leads to the change-over switch, the contacts of the even numbered keys being connected to auxiliary common leads respectively passing through a relay winding to the said common leads to the change-over switch.

24. In a card punching machine, a punch system, actuating and setting means therefor, a keyboard system comprising two sets of digit keys, the keys of one of said sets having single pairs of contacts respectively connected to magnets in said setting means and the keys of the other set having double pairs of contacts, a changeover switch adapted to energize one or the other of said double pairs for each key, and a pair of common leads between said change-over switch and said double contacts, the contact pairs having one of each connected to said set of common leads, one contact of each odd digit key being connected to one or the other of the common leads to the change-over switch, the contacts of the even numbered keys being connected to auxiliary common leads respectively passing through a relay winding to the said common leads from the change-over switch, the contacts of the same relays being connected in parallel to contacts for closing one of the digit circuits.

25. A card punching machine having card punching means, and means for controlling the set-up for the card punching means including a set-basket, plungers therein arranged in denominational rows or columns, a traveling carriage for setting up a condition in said set-basket, means including a keyboard having two duplicate sets of digit keys, means whereby one set of said digit keys is effective upon operation thereof to alternately control each of two groups of said plungers in each of a plurality of denominational columns in said set-basket, the control of either of said groups of plungers being to the exclusion of the other group whereby the other set of digit keys is effective to control all of said plungers in each denominational column of the set-basket, means to return said carriage to its initial position at the completion of each set-up in the said set-basket, and means to render all of said digit keys ineffective while said carriage is returning from an advanced to an initial position.

26. In a card punching machine, the combination of a die, a gang of punches, set bars for the actuation thereof, magnetic means for the actuation of said set-bars, a keyboard for the actuation of said magnetic means comprising two sets of keys operable alternatively for the actuation of set-bars according to different codes, a carriage adapted to travel across said set-bars and carrying members operated by said magnetic means, means to return said carriage from an advanced to an initial position, means operable during said carriage return to prevent effective actuation of any of said keys of either set, and an additional set of keys to control the movement of said carriage, said additional set of keys being operable interchangeably with either of said code keyboards.

REMINGTON RAND INC.,
*Assignee of William W. Lasker, Deceased,*
By J. A. W. SIMSON,
*Secretary.*